United States Patent [19]

Kubota et al.

[11] Patent Number: 4,571,006

[45] Date of Patent: Feb. 18, 1986

[54] BRAKE PRESSURE CONTROL VALVE OF A DOUBLE PIPING SYSTEM

[75] Inventors: Hitoshi Kubota, Minami-ashigara; Teluo Yambe; Akira Ishii, both of Yokosuka; Toshiyuki Takahashi, Kanagawa, all of Japan

[73] Assignees: Nissan Motor Co., Ltd., Yokohama; Nippon Air Brake Co., Ltd., Kobe, both of Japan

[21] Appl. No.: 442,096

[22] Filed: Nov. 16, 1982

[30] Foreign Application Priority Data

Nov. 20, 1981 [JP] Japan .................................. 56-186220
Nov. 20, 1981 [JP] Japan .................................. 56-186221

[51] Int. Cl.⁴ ............................................. B60T 13/00
[52] U.S. Cl. ..................................................... 303/6 C
[58] Field of Search .............. 188/349; 303/6 C, 6 R, 303/84 A, 84 R; 60/591

[56] References Cited

U.S. PATENT DOCUMENTS

| | | | |
|---|---|---|---|
| 3,441,318 | 4/1969 | Bueler | 303/6 C |
| 3,806,200 | 4/1974 | Fulmer | 303/6 C |
| 3,969,000 | 7/1976 | Ohta et al. | 303/6 C |
| 3,970,347 | 7/1976 | Mizusawa | 303/6 C |
| 3,977,731 | 8/1976 | Kasuhara | 188/349 |
| 4,154,260 | 5/1979 | Shutt | 303/6 C |
| 4,269,453 | 5/1981 | Sawyer | 303/6 C |
| 4,281,880 | 8/1981 | Gaiser et al. | 303/6 C |
| 4,284,308 | 8/1981 | Hayashida | 303/6 C |
| 4,422,694 | 12/1983 | Schopper et al. | 303/84 A |

FOREIGN PATENT DOCUMENTS

| | | | |
|---|---|---|---|
| 2416574 | 10/1975 | Fed. Rep. of Germany. | |
| 1523802 | 9/1978 | United Kingdom | 303/6 C |
| 2048409 | 12/1980 | United Kingdom. | |

Primary Examiner—Duane A. Reger
Assistant Examiner—Alvin Oberley
Attorney, Agent, or Firm—Schwartz, Jeffery, Schwaab, Mack, Blumenthal & Evans

[57] ABSTRACT

Each of two valves disposed in a housing is constructed as a unit which comprises a casing in which substantially all essential parts of the valve are housed, and a plug member removably connected to the casing for retaining the parts in the casing. The valve comprises a valve body movably disposed in the casing, a piston slidably disposed in the casing and movable in fore-and-aft directions in response to application of hydraulic pressure thereto to open and close, in cooperation with the valve body, the communication between inlet and outlet ports of the valve, and a valve seat mounted to the piston for assuring the communication open end close function achieved by the valve body and the piston, wherein the valve seat has a configuration which affects the characteristics of the piston, and the valve seat is removably connected to the piston.

4 Claims, 2 Drawing Figures

BRAKE PRESSURE CONTROL VALVE OF A DOUBLE PIPING SYSTEM

BACKGROUND OF THE INVENTION

1. Field of the Invention

The present invention relates to a brake pressure control valve located in the outlet port of a master cylinder for controlling the brake pressure applied to the rear wheels of a motor vehicle, and more particularly to a brake pressure control valve adapted for use with a double piping type hydraulic braking system.

2. Description of the Prior Art

Various kinds of brake pressure control valves are known which control the brake pressure delivered to the rear wheels of the vehicle so that once the master cylinder pressure reaches a certain value (critical pressure), the brake pressure for the rear wheels thereafter increases at a lesser rate than the input pressure from the master cylinder. With this function, the dangerous skid phenomenon wherein the rear wheels are locked prior to the front wheels under braking of the vehicle is prevented.

Now, in order to assure safety of the vehicle, a so-called double piping type hydraulic braking system is widely employed, which includes two groups of brake systems so that even when one system fails to operate, the other system operates to brake the vehicle. The X-piping system and J—J piping system are known as the double piping system.

When the double piping system is employed, two brake pressure control valves become necessary which are respectively mounted in the two (double) hydraulic braking systems. Usually, these two control valves are assembled in a single housing for the purpose of reduction of mounting space and the production cost. Furthermore, for such purpose, it is also usual to use a housing integrated with the master cylinder, such as a tandem master cylinder.

However, most of the brake pressure control valves are constructed to employ the housing as an essential part thereof, so that the operational function of each control valve cannot be expected until the valve is assembled in the housing. In fact, hitherto, the performance test of each valve has been carried out after assembling these two valves in the housing. Thus, when a defect is found in the assembled valve unit, it is necessary to take out the parts of the valves from the housing one by one in an awkward manner. This disassembling work and next-necessitated reassembling work are quite troublesome and thus take a much time.

Apart from the above, in order to adjust or vary the output characteristics of the valve, it has been necessary to provide a number of additional components because each part of the valve is constructed exclusively for a given type valve. In fact, hitherto, for production of various valves having different output characteristics, a number of parts of the same kind but differently formed have been prepared throughout several essential components.

Handling this number of parts is troublesome and thus raises the production cost of the finished valve device.

SUMMARY OF THE INVENTION

Therefore, it is an essential object of the present invention to provide a brake pressure control valve which is free of the above-mentioned drawback.

According to the present invention, there is provided a brake pressure control valve for a double piping hydraulic braking system, which comprises a housing having a bore formed therein; a pair of substantially identical valve units which are coaxially and symmetrically arranged in the bore; and first means removably connected to said housing for retaining the valve units in the bore, wherein each of the valve units comprises a casing in which substantially all essential parts of the valve are housed, and second means removably connected to the casing for retaining the substantially all essential parts in the casing.

According to the present invention, there is further provided a hydraulic pressure control valve unit which comprises a casing having a blind bore formed therein; a valve body movably disposed in the blind bore; a piston slidably disposed in the blind bore and movable in fore-and-aft directions in response to application of hydraulic pressure thereto to open and close, in cooperation with the valve body, the communication between inlet and outlet ports of the valve unit; and a valve seat mounted to the piston for assuring the communication open and close function achieved by the valve body and the piston, wherein the valve seat has a configuration which affects the characteristics of the piston, and the valve seat is removably connected to the piston.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
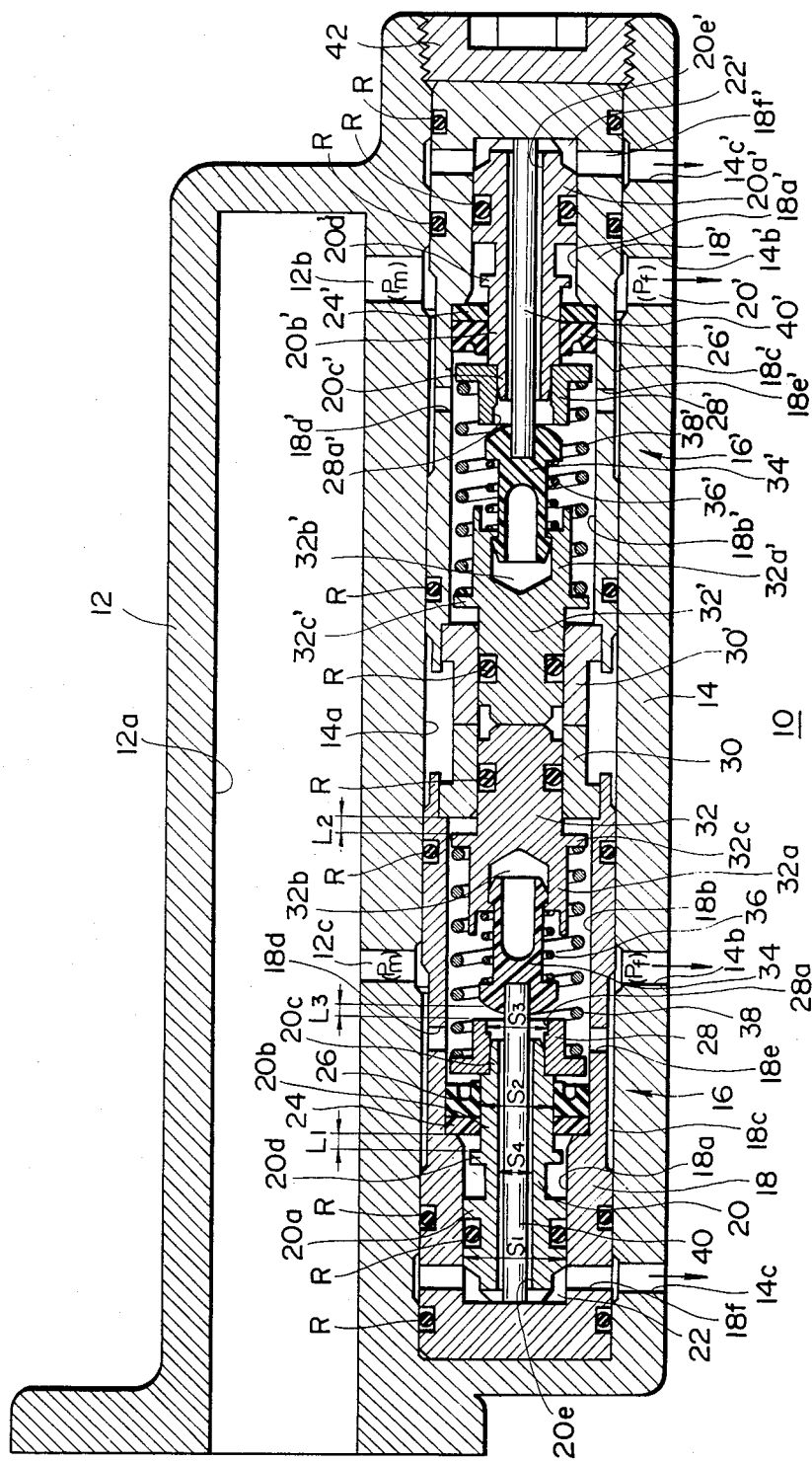
FIG. 1 is a longitudinally sectioned view of a brake pressure control valve according to the present invention.

Referring to FIG. 1 of the drawings, there is shown a brake pressure control valve 10 according to the present invention. The valve 10 is integrated with a conventional tandem master cylinder 12. Although not shown in the drawing, primary and secondary pistons are operatively disposed in a bore 12a of the cylinder 12, so that upon depression of a brake pedal (not shown), a master cylinder pressure $P_m$ is produced equally at its outlet ports 12b and 12c in a conventional manner.

The brake pressure control valve 10 of the invention comprises an elongate housing 14 which is integrated with the body of the master cylinder 12. Within a straight bore 14a of the housing 14, there are mounted in tandem manner first and second proportioning valve units 16 and 16'. These two units 16 and 16' have identical constructions and are arranged coaxially and symmetrically to each other. Thus, the following description on the construction will be directed to only the first valve unit 16. The corresponding parts and portions of the second unit 16' are identified by the same reference numerals but with a prime.

The valve unit 16 comprises a valve casing 18 sealingly disposed in the left half of the straight bore 14a.

The valve casing 18 has therein a blind bore comprising aligned smaller and larger diameter bore portions 18a and 18b which are merged. Designated by references R are seal rings.

A pressure control piston 20 is slidably disposed in the bore of the casing 18 with its largest diameter portion 20a sealingly received in the smaller diameter bore portion 18a of the casing 18. With this, an outlet chamber 22 is defined at the bottom of the bore portion 18a. A medium diameter portion 20b of the piston 20 is slidably and sealingly supported by both a holder 24 and a seal member 26 which are retained in the larger diameter bore portion 18b of the casing 18. The piston 20 has at its right end a smallest diameter portion 20c which is exposed to the larger diameter bore portion 18b. The piston 20 is further formed with an annular ridge 20d between the largest and medium diameter portions 20a and 20b, which is engageable with the holder 24 to limit the axial displacement of the piston 20 relative to the holder 24 to a value of $L_1$. The piston 26 is formed with an axially extending through passage 20e which connects the outlet chamber 22 with the larger diameter bore portion 18b, and an annular valve seat 28 is removably mounted on the smallest diameter portion 20c.

An annular hollow plug 30 is retained in the open end of the casing 18, and a free piston 32 is slidably and sealingly disposed in the hollow plug 30 with its enlarged portion 32a projected into the larger diameter bore portion 18b of the casing 18. With this, the larger diameter bore portion 18b acts as an inlet chamber for a reason which will become clear hereinafter. The enlarged portion 32a is formed with a blind bore 32b which receives therein a portion of a valve body 34. The blind bore 32b is formed at its mouth portion with an inward projection (no numeral) to which a projection (no numeral) of the valve body 34 is engageable to suppress disconnection of the valve body 34 from the bore 32b. A coil spring 36 is compressed between the head of the valve body 34 and the enlarged portion 32a of the free piston 32 to bias the valve body 34 away from the free piston 32. The free piston 32 is formed thereon with an annular ridge 32c. Another coil spring 38 is compressed between the annular ridge 32c of the free piston 32 and the before-mentioned valve seat 28 to bias them, that is, the free piston 32 and the piston 20 away from each other. A valve stem 40 extending from the valve body 34 passes through the through passage 20e of the piston 20 and is contactable at its leading end with the bottom of the blind bore 18a of the casing 18 under a certain condition which is illustrated.

The casing 18 is formed with a wide annular groove 18c therearound which forms a chamber communicating with the outlet port 12c (or 12b) of the master cylinder 12. The valve casing 18 is formed at its radially opposed sides with inlet and outlet ports 18d and 18e which connect the chamber of the groove 18c with the larger diameter bore portion 18b (or inlet chamber). The chamber of the annular groove 18c connects with a first outlet port 14b which is formed in the housing 14 of the valve 10. With this, the outlet port 12c (or 12b) of the master cylinder 12 is constantly communicated with the first outlet port 14b, so that the master cylinder pressure $P_m$ is directly applied to the first outlet port 14b irrespective of magnitude of the pressure $P_m$. The valve casing 18 has near the bottom of the bore thereof another outlet port 18f which communicates the outlet chamber 22 with a second outlet port 14c which is formed in the housing 14 of the valve 10.

As will be seen from the drawing, the valve seat 28 is of a hollow member and has a mouth portion 28a at one end which faces to the head of the valve body 34. If desired, the valve seat 28 may be screwed to the smallest diameter portion 20c of the piston 20 in order to facilitate connection and disconnection of the valve seat 28 with and from the piston 20.

Under the illustrated condition wherein the rightmost edge of the free piston 32 is flush with that of the hollow plug 30, the annular ridge 20d of the piston 20 is separated from the holder 24 by $L_1$, the annular ridge 32c of the free piston 32 is separated from the inside end of the hollow plug 32 by $L_2$, the valve seat 28 is separated from the head of the valve body 34 by $L_3$, and a relation of $L_3 < L_1 < L_2 + L_3$ is established.

Assembly procedure of the pressure control valve 10 of the present invention will be described herein next.

First, the valve unit 16 (or 16') is assembled in the following manner:

The piston 20 is inserted into the bore of the valve casing 18 and then the holder 24 and the seal member 26 are inserted in this order into the casing 18, riding on the piston 20. The annular valve seat 28 is then put on the smallest diameter portion 20c of the piston 20. A unit consisting of the free piston 32, the coil spring 36 and the valve body 34 with the valve stem 40 which are previously assembled is then put in the casing 18 with the coil spring 38 disposed between the valve seat 28 and the free piston 32, having the valve stem 40 passed through the straight passage 20e of the piston 20. Then, the hollow plug 30 is removably connected to the open end of the casing 18.

The two valve units 16 and 16' which have been assembled in the above-stated manner are assembled in the housing 14 in the following manner:

First, the unit 16 is inserted into the straight bore 14a of the housing 14 with the closed side of the casing 18 facing the bottom of the straight bore 14a, and is set in the left-half side (in FIG. 1) of the bore 14a. Then, the other unit 16' is inserted into the bore 14a with the hollow plug 30' facing the unit 16, and is brought to a position where the hollow plug 30' thereof is in abutment with the hollow plug 30 of the unit 16. A plug 42 is screwed to the open end of the bore 14a to retain these units 16 and 16' in the bore 14a in the illustrated manner.

When the valve 10 of the invention is employed in a double piping braking system arranged, for example, in the X-piping manner, the first outlet port 14b is connected to the left-side front wheel brake cylinder, the other first outlet port 14b' to the right-side front wheel brake cylinder, the second outlet port 14c to the right-side rear wheel brake cylinder and the other second outlet port 14c' to the left-side rear wheel brake cylinder.

In the following, operation of the valve 10 will be described.

For facilitation, the description of the operation will be commenced with respect to the condition shown in FIG. 1 wherein the valve units 16 and 16' are in their rest or inoperative conditions. Under this condition, the head of the valve body 34 (or 34') is separated by the distance of $L_3$ from the valve seat 28 (or 28') thereby to communicate the inlet chamber 18b (or 18b') with the outlet chamber 22 (or 22') through the passage 20e (or 20e') of the piston 20 (or 20').

When now the brake pedal (not shown) is depressed to a certain extent for the purpose of braking the vehicle, the tandem master cylinder 12 produces master cylinder pressure $P_m$ at each of the outlet ports 12b and 12c thereof. The pressure $P_m$ is directly applied to both the front wheel brake cylinders as front wheel brake pressure $P_f$ through the constantly communicated inlet port 18d (or 18d'), inlet chamber 18b (18b'), outlet port 18e (or 18e') and first outlet port 14b (or 14b'), and thus brakes the front wheels. It is thus to be noted that the front wheel brake pressure $P_f$ is always equal to the master cylinder pressure $P_m$. At the same time, the master cylinder pressure $P_m$ at the outlet port 12c (or 12b) is directly applied to both the rear wheel brake cylinders as rear wheel brake pressure $P_r$ through the inlet port 18d (or 18d'), the inlet chamber 18b (18b'), the mouth portion 28a (or 28a') of the valve seat 28 (28'), the passage 20e (or 20e') of the piston 20 (or 20'), the outlet chamber 22 (or 22') and the second outlet port 14c (or 14c'), and thus brakes the rear wheels. Accordingly, during this initial period, the rear wheel brake pressure $P_r$ increases at the same rate as the master cylinder pressure $P_m$, as is indicated by the line "a" in FIG. 2.

In order to facilitate the following description regarding the pressure control function of the valve 10, the sectional area at the largest diameter portion 20a (or 20a') of the piston 20 (or 20') will be designated by $S_1$, the sectional area of the medium diameter portion 20b (or 20b') by $S_2$, the sectional area of the mouth portion 28a (or 28a') of the valve seat 28 (or 28') by $S_3$ which is smaller than $S_2$, the sectional area of the passage 20e (20e') of the piston 20 (20') by $S_4$, and the force generated by the spring 38 (or 38') by F. With these references, the force balance applied to the pistons 20 and 20' is explained by the following equation:

$$(S_1-S_4)P_r-(S_3-S_4)P_r=(S_2-S_3)P_m+F$$

That is, $$(S_1-S_3)P_r=(S_2-S_3)P_m+F \quad (1)$$

In the above equation (1), the left term represents the force which is applied to the pistons 20 and 20' in directions to bias them close to each other, while the right term represents the force which is applied to them in directions to bias them away from each other.

Now, since $S_1$ is greater than $S_2$, and $P_r$ is equal to $P_m$ during the above-mentioned initial period, the following inequality is established:

$$(S_1-S_3)P_r>(S_2-S_3)P_m \quad (2)$$

Thus, during the above-mentioned initial period, the pistons 20 and 20' and thus the valve seats 28 and 28' move gradually toward the valve bodies 34 and 34' against the biasing springs 38 and 38' as the master cylinder pressure $P_m$ increases.

When the master cylinder pressure $P_m$ reaches a predetermined value (that is critical pressure), the valve seats 28 and 28' become in contact with the corresponding valve bodies 34 and 34', resulting in that the mouth portions 28a and 28a' of the valve seats 28 and 28' are closed.

Thus, thereafter, the direct application of the master cylinder pressure $P_m$ to the rear wheel brake cylinders is suppressed, inducing a relation of $P_r \neq P_m$. In this condition, the rear wheel brake pressure $P_r$ is represented by the following equation:

$$P_r = \frac{S_2-S_3}{S_1-S_3}P_m + \frac{F}{S_1-S_3} \quad (3)$$

Figure 2:
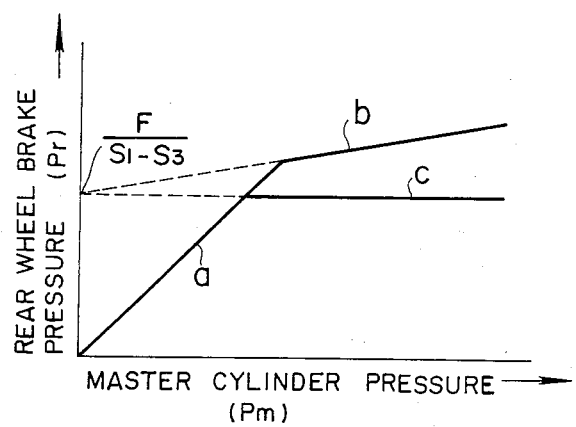
FIG. 2 is a graph showing the characteristics of the brake pressure control valve of the invention.

Now, since $S_2$ is greater than $S_3$, the rear wheel brake pressure $P_r$ increases thereafter at a rate lesser than that given until the master cylinder pressure $P_m$ reaches the critical pressure, as is indicated by the line "b" in FIG. 2. With this pressure control, the dangerous skid phenomenon wherein the rear wheels are locked prior to the front wheels during the braking is prevented. In fact, each valve unit 16 or 16' described above acts as a so-called proportioning valve.

When, during the above-mentioned pressure control operation, the pressure in the inlet chamber 18b and that in the other inlet chamber 18b' become unbalanced by some reason, the free pistons 32 and 32' move as a unit in a direction to equalize the pressure in these inlet chambers 18b and 18b'. Thus, the hydraulic pressure in one piping system associated with one valve unit 16 becomes equal to that in the other piping system associated with the other valve unit 16'.

When, now, one system for example the system associated with the valve unit 16' fails to operate, the free piston 32 and thus the other free piston 32' are moved rightward (in FIG. 1) by a distance of $L_2$ due to the lack of pressure in the inlet chamber 18b'. At the same time, the master cylinder pressure $P_m$ urges the piston 20 toward the valve body 34 by the same reason as has been mentioned hereinabove. However, the beforementioned relation $L_1 < L_2 + L_3$ induces that the valve seat 28 fails to contact with the head of the valve body 34 leaving a clearance therebetween. Thus, under this condition, the master cylinder pressure $P_m$ is directly applied not only to the associated front wheel brake cylinder (left-side front wheel) but also to the associated rear wheel brake cylinder (right-side rear wheel) without carrying out the above-mentioned pressure control.

Assuming that each of the pistons 20 and 20' of the valve units 16 and 16' is so constructed that $S_2$ is equal to $S_3$, each unit acts as a so-called limiting valve by the reason described herein next. That is, if the relation of $S_2 = S_3$ is established, the following equation is given from the equation (3):

$$P_r = \frac{F}{S_1-S_3} = \text{constant} \quad (4)$$

As is understood from this equation, after reaching the critical pressure, the rear wheel brake pressure $P_r$ does not increase any more as is indicated by the line "c" in FIG. 2. This phenomenon also prevents the dangerous skid of the vehicle under braking as is known to those skilled in the art.

Features of the control valve 10 and advantages given by the same are as follows.

(1) Each valve unit 16 or 16' constitutes a finished device thereof without using any parts of the master cylinder integrated housing 14. This means that each valve unit can be independently pre-tested before being assembled in the housing 14. Since the housing 14 for each valve unit 16 or 16' provides the unit with no essential parts of the valve unit, the housing 14 can be constructed quite simply, inducing reduced production cost of the master cylinder unit 12. Even if a defect is found in the valve unit 16 or 16' after assemblage of the units 16 and 16' in the housing 14, the repair work requires only replacing the defective valve unit with a new one, which is simple work.

(2) Each valve seat 28 or 28' is removably mounted to the piston 20 or 20'. This means that various kinds of valve seats having different mouth sizes ($S_3$) are usable as the valve seat for a given piston. Simply by changing the valve seat, the characteristics of the valve unit 16 or 16' changes, that is, in fact, the unit is changeable to a proportioning valve or a limiting valve.

What is claimed is:

1. A brake pressure control valve for a double piping hydraulic braking system, comprising:
    a housing having a bore formed therein;
    a pair of substantially identical valve units which are coaxially and symmetrically arranged in said bore;
    first means removably connected to said housing for retaining said valve units in said bore,
    wherein each of said valve units comprises a casing in which substantially all essential parts of the valve unit are housed, and second means removably connected to said casing for retaining said substantially all essential parts in said casing,
    wherein said first means is arranged to secure the casing of each valve unit against translational movement relative to said housing; and
    wherein said valve units are so arranged that when one of the units fails to operate upon application of hydraulic pressure thereto, the other unit keeps its open position regardless of the presence of conditions which would otherwise cause said other unit to assume a position other than said open position.

2. A brake pressure control valve as claimed in claim 1, in which said valve unit further comprises:
    a valve body movably disposed in a blind bore formed in said casing;
    a piston slidably disposed in said blind bore and movable in fore-and-aft directions in response to application of hydraulic pressure thereto thereby to open and close, in cooperation with said valve body, the communication between inlet and outlet ports of the valve unit; and
    a valve seat removably fixed to said piston for assuring the opening and closing function achieved by cooperation of said valve body and said piston, said valve seat having a configuration which affects the characteristics of said piston.

3. A brake pressure control valve as claimed in claim 2, further comprising:
    a valve stem extending from said valve body and passing through a through hole formed in said piston to be engageable at its leading end with the bottom of said blind bore;
    a free piston sealingly and slidably supported by said second means, said free piston having an extreme end in abutment with the corresponding end of another free piston of the other valve unit, said free piston having therein a bore into which a portion of said valve body is insertable;
    a first spring compressed between said valve seat and said free piston thereby to bias them away from each other;
    a second spring compressed between said valve body and said free piston to bias them away from each other; and
    stop means for suppressing disconnection of said valve body from said free piston.

4. A hydraulic pressure control valve unit comprising:
    a casing having a blind bore formed therein;
    a valve body movably disposed in said blind bore;
    a piston slidably disposed in said blind bore and movable in fore-and-aft directions in response to application of hydraulic pressure thereto to open and close, in coopertion with said valve body, the communication between inlet and outlet ports of the valve unit;
    a valve seat mounted to said piston for assuring the communication opening and closing function achieved by cooperation of said valve body and said piston, wherein said valve seat has a configuration which affects the characteristics of said piston, and said valve seat is removably connected to said piston;
    a valve stem extending from said valve body and passing through a through passage formed in said piston to be engageable at its leading end with the bottom of said blind bore;
    a free piston sealingly and slidably supported by a hollow plug retained in the open end of said blind bore, said free piston having an extreme end which is projectable outwardly from said hollow plug upon a certain condition, said free piston having therein a bore into which a portion of said valve body is insertable;
    a first spring compressed between said valve seat and said free piston thereby to bias them away from each other;
    a second spring compressed between said valve body and said free piston to bias them away from each other; and
    stop means for suppressing excessive displacement of said valve body relative to said free piston.

* * * * *